United States Patent [19]

DeVecchi

[11] 4,427,427

[45] Jan. 24, 1984

[54] VERTICAL LAMINAR FLOW FILTER MODULE

[75] Inventor: Francisco DeVecchi, Farmington Hills, Mich.

[73] Assignee: Veco S.A., Cuernavaca, Mexico

[21] Appl. No.: 340,636

[22] Filed: Jan. 19, 1982

[51] Int. Cl.$^3$ .................. B01D 46/10; F23J 11/00
[52] U.S. Cl. .................. 55/358; 55/385 A; 55/470; 55/472; 55/483; 55/484; 55/DIG. 18; 55/DIG. 29; 98/40 N; 98/41 AV; 98/115 LH
[58] Field of Search ............ 55/350, 356, 358, 385 A, 55/470, 472, 473, 483, 484, DIG. 18, DIG. 29, 482; 98/40 N, 41 AV, 115 LH, 115 R; 128/1 R, 1 B; 312/1, 3

[56] References Cited

U.S. PATENT DOCUMENTS

| | | |
|---|---|---|
| Re. 27,701 | 7/1973 | Allan, Jr. et al. . |
| 2,709,954 | 6/1955 | Baker . |
| 2,999,448 | 9/1961 | Abler et al. . |
| 3,057,468 | 10/1962 | Allan, Jr. . |
| 3,158,457 | 11/1964 | Whitfield . |
| 3,186,149 | 6/1965 | Ayers . |
| 3,229,611 | 1/1966 | Berger, Jr. . |
| 3,251,177 | 5/1966 | Baker . |
| 3,284,148 | 11/1966 | Ramniceanu . |
| 3,301,167 | 1/1967 | Howard et al. . |
| 3,303,839 | 2/1967 | Tavan . |
| 3,318,076 | 5/1967 | Baker . |
| 3,336,855 | 8/1967 | Messina . |
| 3,363,539 | 1/1968 | Taylor et al. . |
| 3,367,257 | 2/1968 | Raider et al. . |
| 3,368,523 | 2/1968 | Becker . |
| 3,418,915 | 12/1968 | Marble . |
| 3,426,512 | 2/1969 | Nesher . |
| 3,465,666 | 9/1969 | Knab . |
| 3,470,679 | 10/1969 | Ramsey . |
| 3,479,947 | 11/1969 | Myers . |
| 3,486,311 | 12/1969 | Allan, Jr. . |
| 3,494,112 | 2/1970 | Deckas . |
| 3,511,162 | 5/1970 | Truhan . |
| 3,529,406 | 9/1970 | Allan, Jr. et al. . |
| 3,540,079 | 11/1970 | Bush . |
| 3,616,624 | 11/1971 | Marsh . |
| 3,629,999 | 12/1971 | Marsh et al. . |
| 3,665,917 | 5/1972 | Jensen . |
| 3,686,836 | 8/1972 | RabiHood et al. . |
| 3,703,801 | 11/1972 | Deckas . |
| 3,715,972 | 2/1973 | Kelso et al. . |
| 3,726,204 | 4/1973 | Lindeström ............... 98/40 N |
| 3,728,866 | 4/1973 | Layton . |
| 3,747,505 | 7/1973 | Turko . |
| 3,780,503 | 12/1973 | Smith . |
| 3,838,556 | 10/1974 | Finger . |
| 3,880,625 | 4/1975 | Shook . |
| 3,895,570 | 7/1975 | Eagleson, Jr. . |
| 3,897,229 | 7/1975 | Lada . |
| 3,923,482 | 12/1975 | Knab et al. ............... 55/473 |
| 3,935,803 | 2/1976 | Bush ........................ 55/473 |
| 3,986,850 | 10/1976 | Wilcox . |
| 4,009,647 | 3/1977 | Howorth ............... 55/DIG. 29 |
| 4,016,809 | 4/1977 | Austin ................... 98/115 LH |
| 4,030,618 | 6/1977 | Wilcox . |
| 4,037,830 | 7/1977 | Polussi et al. . |
| 4,055,075 | 10/1977 | Allan et al. . |
| 4,063,495 | 12/1977 | Duvlis . |
| 4,082,525 | 4/1978 | Allan . |
| 4,098,174 | 7/1978 | Landy . |
| 4,100,847 | 7/1978 | Norton . |
| 4,175,936 | 11/1979 | Lough et al. . |
| 4,178,159 | 12/1979 | Fecteau . |
| 4,217,121 | 8/1980 | Fichter . |
| 4,320,696 | 3/1982 | Daniels et al. ............ 98/41 AV |
| 4,333,750 | 6/1982 | Helmus et al. ............ 55/385 A |

FOREIGN PATENT DOCUMENTS

| | | |
|---|---|---|
| 1009495 | 5/1977 | Canada . |
| 2130255 | 1/1972 | Fed. Rep. of Germany . |
| 5226660 | 2/1977 | Japan . |
| 7104009 | 11/1971 | Netherlands . |
| 1198920 | 7/1970 | United Kingdom . |
| 2555528 | 3/1970 | U.S.S.R. . |

Primary Examiner—David L. Lacey
Attorney, Agent, or Firm—Harness, Dickey & Pierce

[57] ABSTRACT

A module for providing a work area in which one or several people can perform tasks requiring ultra-high efficiency air filtration. The work area is bounded above by a filter module through which a vertical laminar flow of air occurs from one or more HEPA filters. From the perimeter of the module flows a curtain of air in an enclosing and substantially parallel relationship to the laminar flow air to extend the laminar air zone to the floor. The air curtain also passes through a HEPA filter prior to discharge. The angular direction of the air curtain is adjustably controlled by a unique nozzle structure so that when the air curtain contacts the floor turbulence is substantially eliminated and a sweeping action away from the work area is effected. Separate blower systems supply air for the laminar flow air and the enclosing air curtain at differential velocities.

22 Claims, 8 Drawing Figures

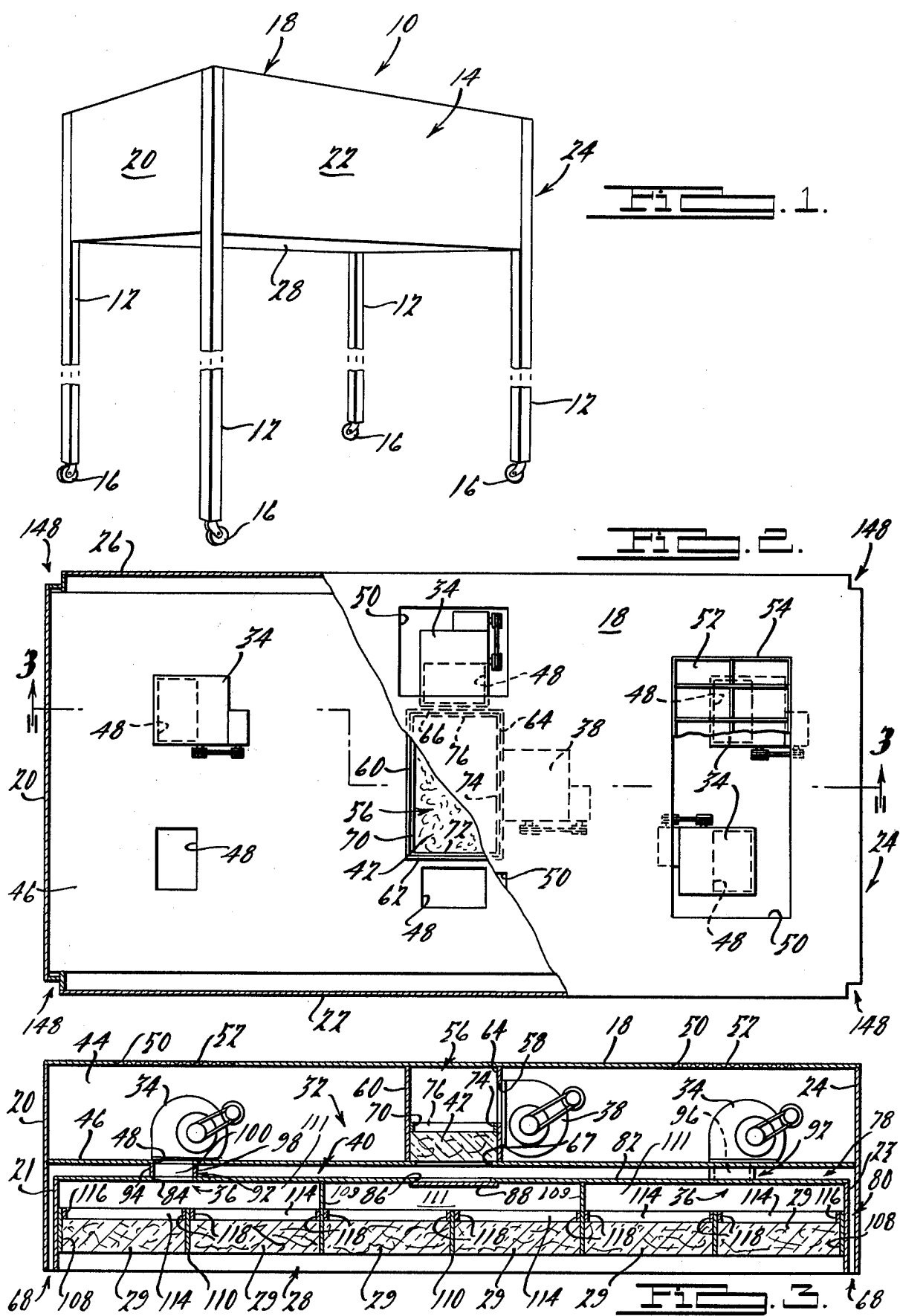

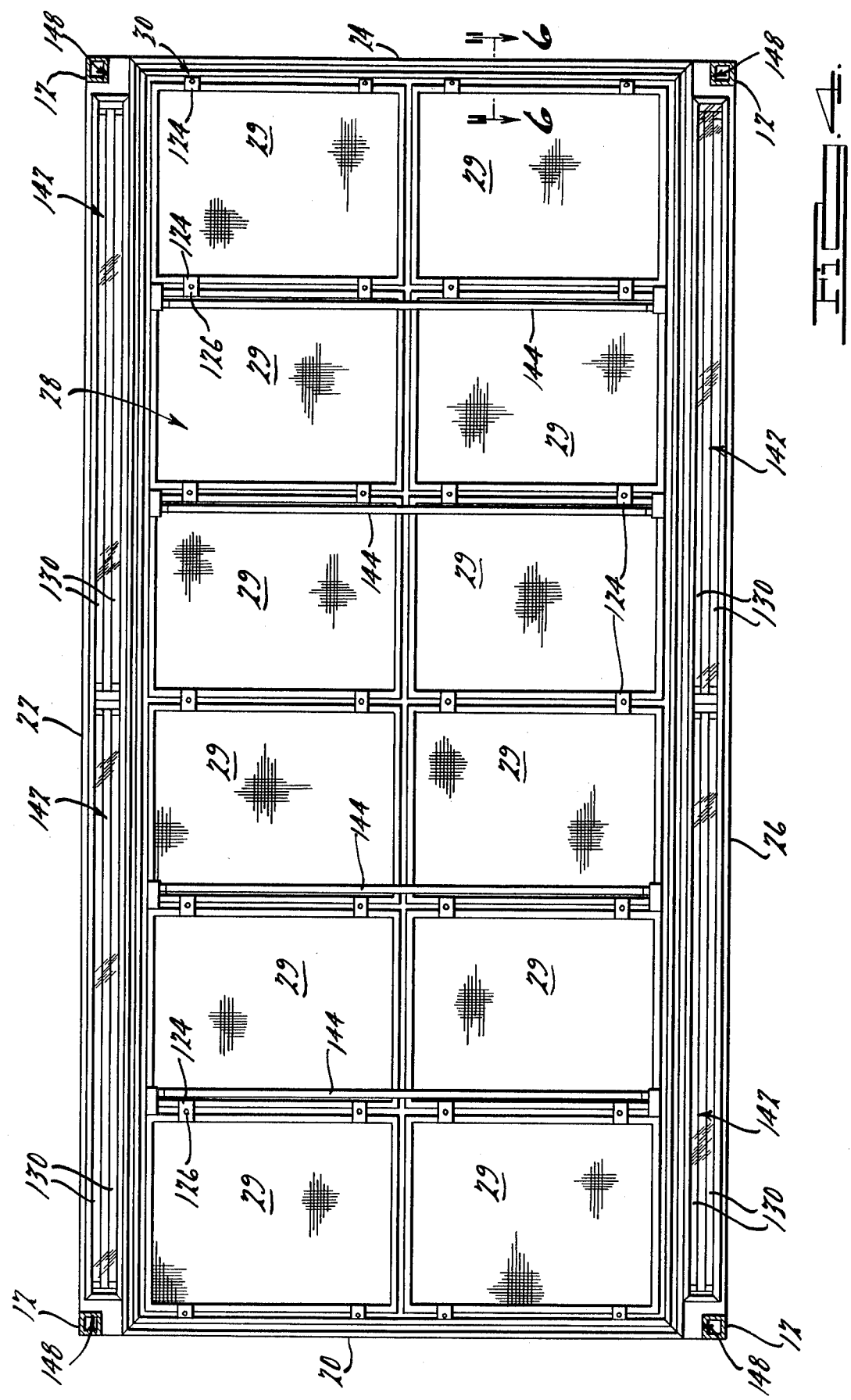

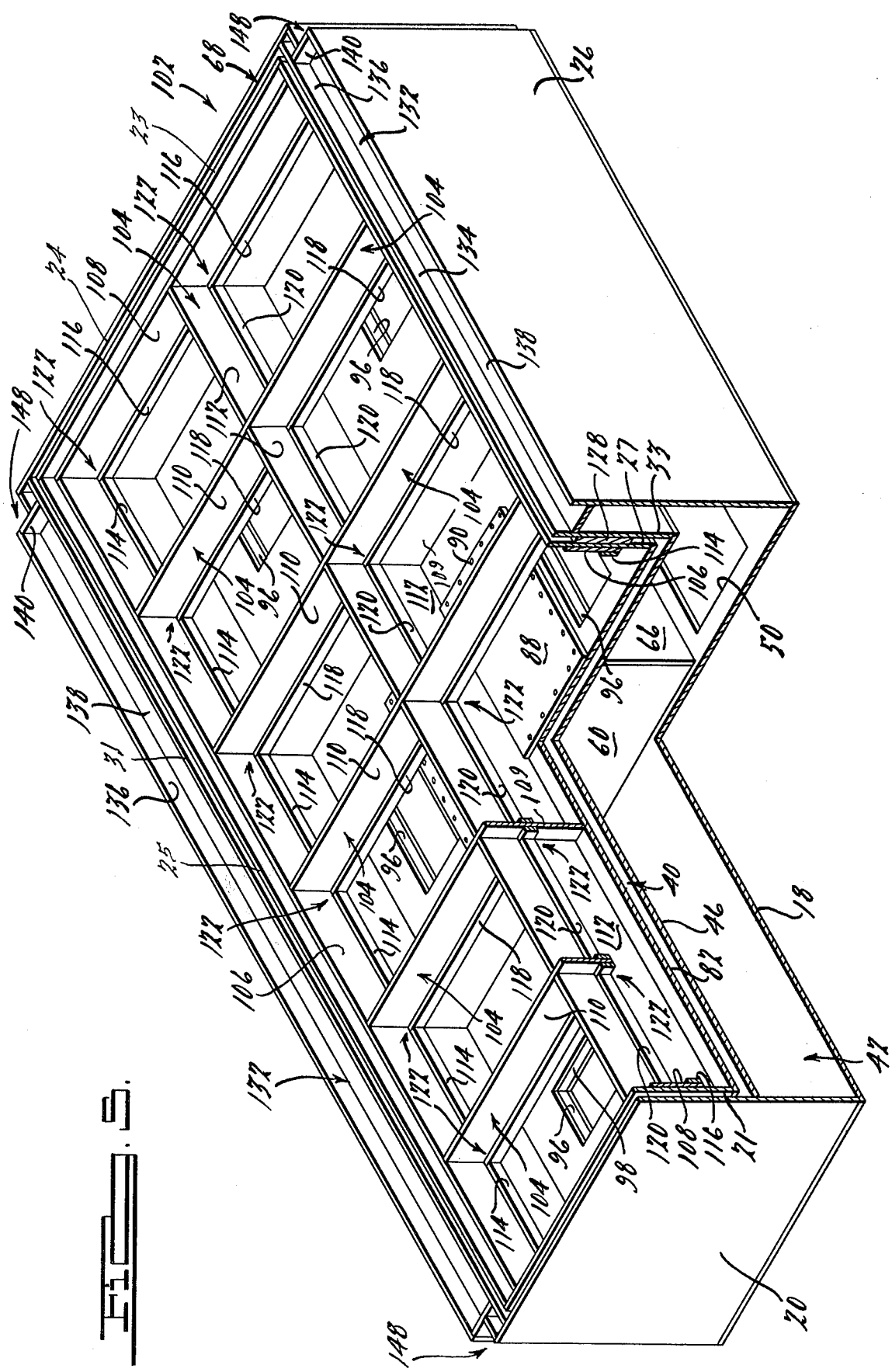

VERTICAL LAMINAR FLOW FILTER MODULE

BACKGROUND AND SUMMARY OF THE INVENTION

This invention relates to apparatus for providing clean air work areas, and more particularly, to an overhead module that provides a bounded, vertically flowing zone of clean air to a work area. The invention works in conjunction with filters to supply virtually contaminant-free air to critical production or laboratory areas.

In the present age of advanced technology, there is an increasing requirement for particulate-free and/or bacteria-free working environments. These environments are typically referred to as clean rooms or clean areas, and to provide such clean working areas with the required contaminant-free air it is a practice to circulate the air through a bank of one or more filters. In many clean areas, particles in the air must not exceed 100 particles larger than 0.3 microns per cubic foot of air. This high level of particulate filtration is achieved by the use of what are in the industry generally called "absolute" or "HEPA" filters. These filters are comprised of suitable filtering media, having corresponding efficiencies, which are placed in a filter frame and sealed with adhesive to form a filter pack. The filter pack is in turn typically mounted and sealed into a supporting structure.

It is known to provide a workbench which has an air filtration system that delivers a horizontal zone of clean air beyond the normal work surface of the workbench. A clear air workbench of this character is disclosed in U.S. Pat. No. 4,016,809, issed Apr. 12, 1977 to Philip R. Austin. In this work center, the work area is confined between directive walls or panels thus severely limiting the flexibility of the working environment. The effect of gravity also eventually distorts the horizontal flow of clean air. Work centers or workbenches of the type disclosed in the prior art are thus limited in their application and are unsatisfactory for situations requiring an environment unrestricted of side walls, panels, etc., such as medical device manufacturing, optical equipment assembly lines, semiconductor production, sterile operating conditions, phases of the electronics industry, and other similar applications.

For the type of above mentioned applications conventional type downflow filter devices with vinyl curtains have been utilized. However, such known devices are also found to be unsatisfactory. Turbulence within the laminar flow area cannot be controlled, purging of generated particles within the laminar flow area cannot be effectively achieved, the direction of the laminar flow cannot be varied, and there is particle retention due to electrostatic conditions associated with the curtains. Furthermore the curtains are in general unsightly, must be periodically disinfected, cleaned, and replaced.

It is also known to provide a downflow filter device in which the vertical flow of filtered air is bounded by an air curtain. An example of a construction of this type is shown in German Offenlegungsschrift [laid-open application] No. 2,130,255. In this device the direction of the laminar flow, defined by the direction of the curtain of air, is fixed and cannot be varied for specific work applications and/or floor arrangements for the most efficient discharge and subsequent removal of filtered air. The curtain of air generated by the German device also does not use HEPA filtered air and thus because of eddy currents generated along the curtain of air, the German device cannot achieve cleanliness.

The present invention has overcome the inadequacies of the prior art by providing a vertical laminar flow filter module that creates maximum protection for a work area environment without sacrificing flexibility. The system incorporates a Class 100 (U.S. Federal Government Standard 209-b) working area with a HEPA filtered curtain of air that discharges downward around the perimeter of the primary filter area. The air curtain eliminates the requirement for vinyl curtains or directive walls or panels. The air curtain is discharged at a relatively high velocity in comparison to the laminar flow of air from the primary filters, thus creating a vacuum and positive pressure which protects against backwash and turbulence, and containing the primary laminar filtered air flow in a downward direction to the floor or other bottom surface. Contaminants are picked up by the vacuum action of the high speed air curtain and are expelled away from the clean laminar flow air by the positive pressure of the jet airstream. By virtue of this arrangement room air currents from any source carrying air-born contaminants are also prevented from entering and violating the work area. A proper balance of the two air streams assures optimal air flow at working levels and prevents contamination causing turbulence found in prior art laminar flow devices or systems when the primary air stream changes from vertical to horizontal flow.

According to the present invention, a vertical laminar flow filter module is provided with an adjustable air nozzle means for varying the direction and velocity of the air curtain. Therefore, it is an advantage of the present invention to provide an improved downflow type filter module that comprises a controllable air curtain for adapting to specialized applications, critical objects, floor slopes, floor materials, and the like. By directing the laminar flow downward from the overhead filter module, a virtually unrestricted clean work area is provided. Separate blowers and passage means are incorporated for the primary laminar flow filtered air and the HEPA filtered perimeter air curtain to provide maximum control of air velocities. Fluorescent lights, which may be located out of the main airstream to eliminate accidental breakage, are included.

Additional advantages and features of the present invention will become apparent from the subsequent description and the appended claims taken in conjunction with the accompanying description.

BRIEF DESCRIPTION OF THE DRAWINGS

FIG. 1 is a perspective view of a vertical laminar flow filter module embodying the present invention;

FIG. 2 is a plan view, broken away, of the blower compartment of the vertical laminar flow filter module;

FIG. 3 is a vertical section taken on the line 3—3 of FIG. 2;

FIG. 4 is a plan view looking upwards from underneath the vertical laminar flow filter module;

FIG. 5 is a perspective view, partially broken away, of the filter mounting structure and air passage means of the present invention;

DESCRIPTION OF THE PREFERRED EMBODIMENT

Figures 6, 7:
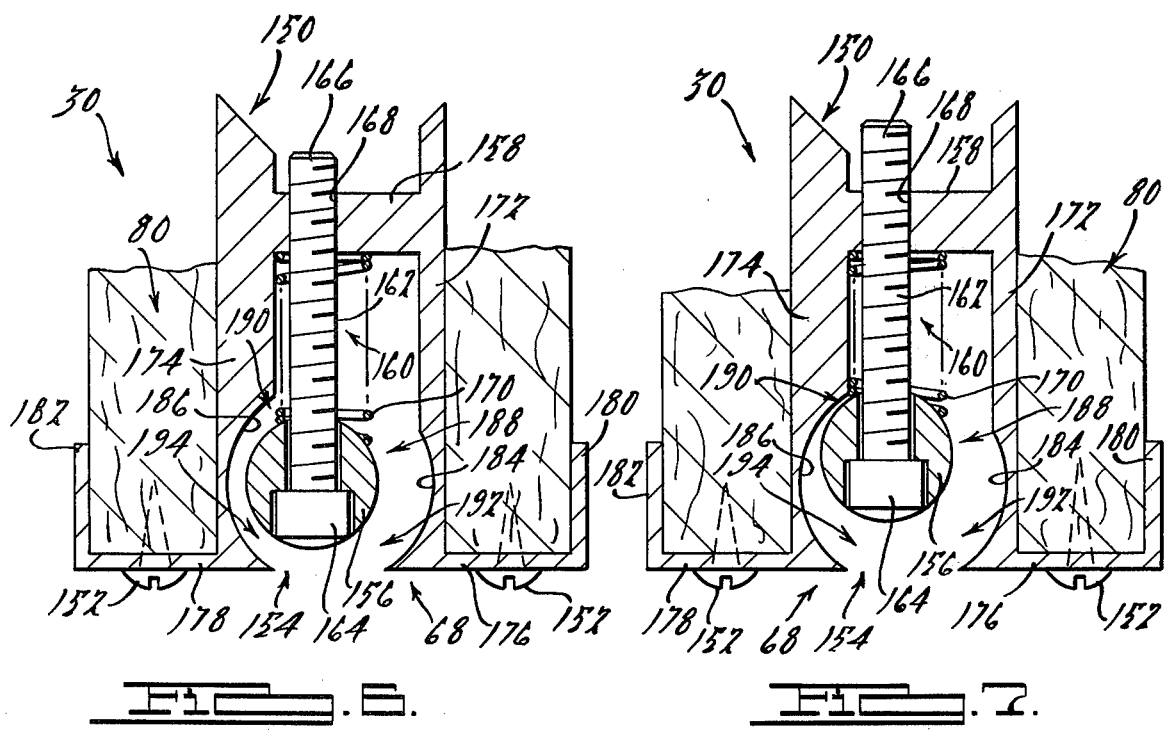
FIG. 6 is an enlarged fragmentary section taken on the line 6—6 of FIG. 4 showing details of the air nozzle means for discharging the air curtain.
FIG. 7 is a similar enlarged fragmentary sectional view taken on the line 6—6 of FIG. 4 showing of the air nozzle means in a different position.

Referring now to the drawings, the vertical laminar flow filter module in accordance with the present invention is shown in FIG. 1 at 10. The vertical laminar flow filter module 10 (hereinafter "filter module 10") includes generally a set of legs 12 that support a filter module box 14 above a floor or other work area surface. The legs 12 may also have wheels or castors 16 thereby lending portability to the filter module 10. Alternatively, the module box 14 may be suspended or otherwise mounted in or on a ceiling surface thus eliminating the need for the legs 12.

As shown in FIGS. 2, 3, and 4, the filter module box 14 has a top 18, sides 20, 22, 24, and 26, and a permeable bottom 28 for the passage of air. In the preferred embodiment of the filter module 10, the permeable bottom 28 is at least one and may be a bank of primary air HEPA filters 29. Extending around the perimeter of the primary air filters 29 is a linear air nozzle means 30 for directing a curtain of air downward to define a work area. The filter module box 14 also includes an air supply means 32 for supplying air to the primary filters 29 and to the air nozzle means 30 so that primary air can be directed downward from the bottom 28 as laminar flow air and so perimeter air can be directed from the nozzle means 30 as the curtain surrounding and containing the laminar flow of air over the work area.

The air supply means 32 includes perimeter and interior air ducts that extend through the module box 14 to the primary filter bank 29 and the air nozzle means 30. The air supply means 32 further comprises at least one primary air supply blower 34 and a primary air passage means 36 for delivering primary air under pressure to the upstream side of the bank of primary filters 29 for passage therethrough, and a perimeter air supply blower 38 and a perimeter air passage means 40 containing a HEPA filter 42 for delivering filtered air through the air nozzle means 30. The primary air supply blowers 34 and the perimeter air supply blower 38 may all be of the statically and dynamically balanced type with direct or belt drive centrifugal variable speed units with vibration isolation mounts for quiet and smooth operation.

As seen in FIGS. 2 and 3, the primary and perimeter air supply blowers 34 and 38 are contained in a blower compartment 44. The blower compartment 44 is bounded by the top 18, sides 20, 22, 24, and 26, and a blower mounting plate 46. The blower mounting plate 46 contains a primary blower opening 48 for each primary blower 34. Over each primary blower opening 48 is mounted a primary air supply blower 34 to the blower mounting plate 46. The top 18 has at least one air inlet opening 50 which serves both to permit unfiltered air to be drawn into the blower compartment 44 and also to provide access to the blower compartment 44 for installing, maintaining, and servicing the air supply blowers. Inlet air may be pre-filtered through a filter media 52 fitted in a light-weight frame 54 to cover the air inlet openings 50. An example of such filter media is the non-woven polyester synthetic fiber type.

The blower compartment 44 also contains a perimeter air supply chamber or plenum 56. The perimeter air supply chamber 56 has a chamber opening 58 to which is mounted the perimeter air supply blower 38. The perimeter air blower chamber is defined by top 18, chamber sides 60, 62, 64, and 66, and the filter 42 which serves as a chamber bottom. The chamber side 60 is removable to permit access to the filter 42 for installation, service, replacement, et citera. The perimeter air supply blower 38 also draws unfiltered air through the air inlet openings 50 and then directs it into the perimeter air supply chamber 56, down through the HEPA filter 42, through a chamber outlet opening 67 that is contained in the blower mounting plate 46, and into the perimeter air passage means 40 where it exits from a leading edge 68 of the perimeter air passage means 40 as a filtered curtain of air. The direction of the air curtain is controlled by the linear air nozzle means 30 which will be more fully described hereinbelow. The perimeter air supply chamber 56 also includes filter hold-down members 70, 72, 74 and 76 which are attached to the chamber sides 60, 62, 64, and 66 respectively. The filter hold-down members are spaced on the chamber sides to correctly position and maintain the filter 42 between the hold-down members and the blower mounting plate 46 within the perimeter air supply chamber 56.

The perimeter air passage means 40 includes a horizontal passage portion 78 that extends horizontally substantially throughout the module box 14, and a vertical passage portion 80 that extends downward from the horizontal passage portion 78 at the periphery of the module box 14 and terminates at the leading edge 68 at the bottom of the module box 14. The vertical passage portion 80 is bounded on the outboard side by the module sides 20 and 24 and by a pair of perimeter passage walls 31 and 33, and on the inboard side by vertical passage walls 21, 23, 25, and 27, respectively. The horizontal passage portion 78 is bounded on top by the blower mounting plate 46 and on the bottom by a passage plate 82 that is substantially parallel to the blower mounting plate 46. The passage plate 82 includes primary air apertures 84 and a perimeter filter test opening 86 that substantially correspond to the primary blower openings 48 and the chamber outlet opening 67, respectively. The perimeter filter test opening 86 permits access to the perimeter air supply HEPA filter 42 after it has been installed and sealed in the chamber 56 to test the filter 42 for leakage with a particle counter or photometer. The test opening is covered by an access panel 88 that is attached to the underside of the passage plate 82 with conventional fasteners 90.

For optimum control and differentiation of primary and perimeter air velocities, separate blowers and separate passage means are incorporated in the filter module 10. To accomplish separation of the primary air passage means 36 and the perimeter air passage means 40, sleeves 92 are provided between the primary blower openings 48 and the primary air apertures 84 to prevent primary air from entering the horizontal passage portion 78 of the perimeter air passage means 40. The sleeves 92 are frames that substantially correspond with the openings 48 and apertures 84 comprised of sleeve members 94, 96, 98, and 100 that are of a width corresponding to the width of the horizontal passage portion 78. The sleeves 92 therefore provide an airtight passage for the primary air to flow directly to the bank of primary filters 29. In this way, the filtered perimeter air in the horizontal passage means 78 is not contaminated by the yet unfiltered primary air. The sleeves 92 also serve as spacers for the horizontal passage portion 78 and as an attachment means for attaching the passage plate 82 to the blower mounting plate 46.

The primary HEPA filters 29 are sealably mounted in a filter supporting structure 102 that is shown in detail in FIG. 5. For clarity of explanation, the filter module 10 is shown in an inverted view in FIG. 5. The filter supporting structure comprises a plurality of filter frames 104 that are sized slightly larger than the frame of the primary filters 29 used. In this manner, the primary filters 29 can be inserted, retained, and sealed into the filter frames 104 of the filter supporting structure 102. The filter supporting structure 102 is comprised of structure sides 106 and structure ends 108. Attached to the structure sides 106 and running parallel to and substantially equidistantly between the structure ends 108, are plenum separators 109. As shown in FIGS. 3 and 5, the plenum separators 109 extend upward to sealingly engage the passage plate 82. The ends of the plenum separators 109 are notched to also sealingly engage the structure sides 106 and the vertical passage walls 25 and 27. Attached to the structure sides 106 and running parallel to and substantially equidistantly between the plenum separators 109, or the plenum separator 109 and the structure end 108, are intermediate members 110. The spacing between the structure ends 108 and the intermediate members 110, or the intermediate members 110 and the plenum separators 109, is substantially equivalent to the width of the primary filters 29. Dividing each individual area defined by the plenum separators 109 and the structure sides 106, or the plenum separator 109, the structure end 108, and the structure sides 106, are plenum dividers 112 which run parallel to the structure sides 106 and extend upward to sealingly engage the passage plate 82, thereby forming the individual filter frames 104 and individual laminar flow plenums 111. The plenum dividers 112 are notched to fit around the intermediate members 110.

Attached to the sides of the filter frames 104, near the upstream ends of the structure sides 106, the structure ends 108, the intermediate members 110 or the plenum separators 109, and the plenum dividers 112, are filter stops 114, 116, 118, and 120, respectively. The filters stops 114, 116, 118, and 120 comprise a stop frame 122 of a perimeter substantially equivalent to the frame of the primary filters 29. When the primary filters 29 are installed into the filter frames 104, they are pressed up against the stop frames 122 and retained there by a plurality of filter mounting brackets 124 that are attached to the downstream edges of the filter supporting structure 102 with a bolt means 126. The plenums 111 are configured to each be fed with positive pressure air flow from one of the primary blowers 34 through the corresponding primary blower opening 48 and aperture 84. In this manner, each of the plenums 111 serve to provide a flow of unfilered air under positive pressure to the upstream side of two of the primary filters 29.

The members of the filter supporting structure 102 are configured to have a depth that extends substantially equivalent to the depth of the frame of the primary filter 29 after it is inserted in the filter frames 104. In this manner, a single filter mounting bracket 124 can be utilized to retain two adjacent primary filters 29. A closed-cell neoprene gasket may be placed between the upstream edge of the frame of the primary filters 29 and the downstream edge of the stop frames 122 to effect a seal between the primary filters 29 and the filter supporting structure 102. Further sealing may be effected by caulking between the downstream abutting edges of the frame of the primary filters 29 and the filter supporting structure 102. Similar neoprene gasket and caulking methods may be used to seal the perimeter air HEPA filter 42 in the perimeter air supply chamber 56. Sealing may also be accomplished utilizing any number of other conventional methods.

The filter supporting structure 102 is attached directly to the inboard side of the vertical passage walls 21, 23, 25, and 27 of the perimeter air passage means 40 by butting the structure sides 106 and structure ends 108 to the vertical passage walls slightly upstream of the leading edge 68 with suitable attachment means. The inboard and outboard sides of the vertical passage portion 80, i.e. the vertical passage walls 21, 23, 25, and 27, and the module sides 20 and 24 and the perimeter air walls 31 and 33, respectively, are spaced apart and attached together by a plurality of spacer blocks 128 that define the width of the vertical passage portion 80 of the perimeter air passage means 40.

Figure 8:
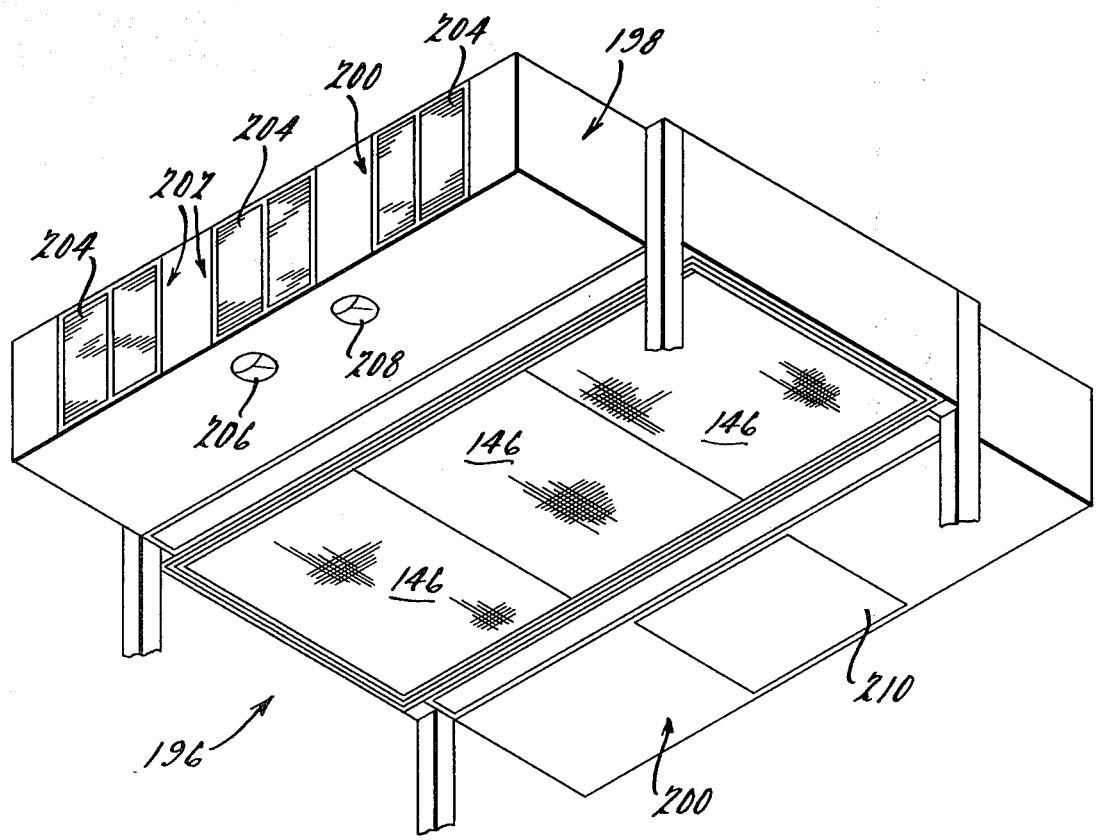
FIG. 8 is a perspective view of another embodiment of the vertical flow filter module of the present invention.

For illumination of the work area, filter module 10 includes a plurality of lights 130 which may be of the white fluorescent type. The lights 130 are provided within side light pockets 132 which are located outside of the perimeter air curtain, and thus the work area, to eliminate accidental breakage. As shown in FIGS. 4 and 5, the light pockets 132 are formed from a portion of the perimeter air walls 31 and 33 as inside pocket walls 134, a portion of the module sides 22 and 26 as outside pocket walls 136, and a pocket bottom 138 that is attached between the inside and outside pocket walls 134 and 136. The pocket bottom 138 serves as a surface to which the lights 130 may be attached. The light pockets 132 also include ends 140. The fluorescent lights 130 may be further protected by flush mounted glass, plastic, or plexiglass covers 142. A plurality of auxilliary lights 144, when required, may be provided on the downstream side of the bank of primary filters 29. As shown in FIG. 8, the auxilliary lights 144 and the bank of primary filters 29 are covered by protective filter grilles 146 that are constructed of perforated anodized aluminum. The protective filter grilles 146 are framed with anodized aluminum for added strength and durability. The protective filter grilles 146 may be locked into place with swivel type retainers attached to the leading edge 68 of the filter module 10.

The light pockets 132 also provide recesses 148 in each corner of the module box 14 for mounting the support legs 12. Special in-line mounting configuration of the type afforded by the recesses 148 gives added structural support to the module box 14.

The leading edge 68 of the filter module 10 comprises a unique nozzle means 30 for adjusting and controlling the velocity, volume, and direction of the air curtain. The unique nozzle design not only allows for adjustments to be made to accommodate commonly encountered problems such as temperature changes, etc. that affect air speeds, but also achieves the advantages of the present invention described below. With particular reference to FIGS. 6 and 7, the linear air nozzle means 30 will be described in greater detail. The air nozzle means 30 includes a linear extrusion 150 that is adapted to fit over the downstream ends of the vertical passage portion 80 and is attached thereto with a screw means 152. The nozzle means 30 comprises a discharge port means 154 in the linear extrusion 150, and a flexible valve element 156 which is mounted on a plurality of support brackets 158 for selectively varying the spacing of the valve element 156 with respect to the linear discharge port means 154. The valve element 156 is mounted to the support bracket 158 by a valve element mounting means 160 which includes an adjustment screw 162 that has a head 164 which is seated up through the downstream side of the valve element 156 and a threaded end 166 which is threaded into a tapped bracket hole 168 which lies in the bracket 158, and a spring means 170 that fits over the adjustment screw 162 between the valve element 156 and the extrusion support bracket 158 to urge the valve element 156 downward at all times. By suitably advancing or retracting the valve element 156 by turning of the adjustment screw 162, selective positioning of the valve element 156 may be obtained. This adjustment feature allows the operator of the unit to assure that an air screen or curtain of desired velocity, direction, and volume is provided entirely around the periphery of the work area. It also allows the operator to selectively choose an air curtain of a different intensity at any specific location, such as, for example, at one side of the work area, as distinguished from the intensity at the other side of the work area. The support brackets are ideally provided approximately twelve to eighteen inches apart along the extrusion 150 for optimum support and control of the valve element 156.

The linear extrusion 150 is configured generally in the shape of an H-section with inner and outer extrusion walls 172 and 174 that have flanges 176 and 178, respectively, extending outward from the extrusion 150 substantially equivalent to the width of the downstream ends of the vertical passage portion 80. Extending upwards from the outward ends of the flanges 176 and 178 are extensions 180 and 182, respectively. Flanges 176 and 178 and extensions 180 and 182 serve to support and attach the linear extrusion 150 onto the downward ends, or leading edge 68, of the vertical passage portion 80.

The outer extrusion wall 174 of the linear extrusion 150 is thicker than the inner extrusion wall 172. Near the downstream end the inner and outer extrusion walls 172 and 174 of the extrusion 150 are curved recess 184 and 186, respectively. The recesses 184 and 186 are arcuate in configuration and are shaped as if generated with substantially the same radius, from substantially the same point, and from substantially along the axial center-line of the extrusion 150. Thus, the arcuate recess 186 carried in the thicker outer extrusion wall 174 is larger than the recess 184 carried in the thinner inner extrusion wall 172. The downstream portion of recesses 184 and 186, however, extends substantially equivalently inward.

The valve element 156 is carried within the recesses 184 and 186 and is eccentrically mounted to the extrusion support bracket 158 slightly toward the outer extrusion wall 174 from the axial center-line of the extrusion 150. The perimeter air that forms the air curtain of the filter module 10 flows on both sides of the valve element 156 as it passes through the extrusion 150. The discharge port means 154 of the nozzle means 30 may be upper inboard and outboard ports 188 and 190 that are defined by the spaces between the valve element 156 and the upper ends of the arcuate recesses 184 and 186 carried in the inner and outer extrusion walls 172 and 174, respectively, or lower inboard and outboard ports 192 and 194 that are defined by the spaces between the valve element 156 and the lower ends of the arcuate recesses 184 and 186, respectively. The position of the valve element 156 determines which set of the discharge ports 188 and 190, or 192 and 194, are controlling. When the valve element 156 is adjusted away from the horizontal centerline of the recesses 184 and 186 and toward the upper end of the recesses 184 and 186, the ports 188 and 190 control, and vice versa.

When the valve element 156 is controllably adjusted upward or downward within the recesses 184 and 186, the flow of filtered perimeter air that passes on each side of the valve element 156 is altered. As the valve element 156 is moved upwards from the center of the recesses 184 and 186, the flow of air on the outboard side of the valve element 156 is decreased because the port 190 is decreased faster than the port 188 and hence more perimeter air passes on the inboard side of the valve element 156 than on the outboard side, thus increasing the intensity of the inboard side air as a function of volume and velocity. Because the shape of the valve element 156 and the recesses 184 and 186 are of an arcuate configuration, horizontal directional components are imparted to the portions of perimeter air that exit from each side of the extrusion 150 and form the air curtain. For example, the direction of the portion of perimeter air coming out of the extrusion 150 on the inboard side tends to be down and away from the filter module 10 while the perimeter air leaving the outboard side of the extrusion 150 tends to leave in a direction down and in towards the filter module 10. When these two portions of the air curtain are convergingly exiting at the same velocity and volume, their opposing horizontal direction components are negated and the resultant air curtain travels towards the floor or other surface substantially parallel to the side walls of the module box 14. As the port 190 is decreased faster than the port 188, the intensity of the portion of perimeter air in an outward direction is greater than the intensity of the portion of perimeter air in an inward direction and the net result is a stream of air curtain air in varying degrees of an outward direction.

The horizontal component in the down and outward direction of the air curtain is important because as the air curtain meets a floor or other horizontal surface, the horizontal component becomes dominant and acts to "sweep" across the floor away from the clean work area with a minimum of turbulence. If a non-horizontal floor or other surface is encountered, the valve element 156 can be adjusted to control the direction, velocity, and volume of the air curtain to achieve the optimum sweeping effect.

The discharge velocities of the primary air flow and the perimeter air curtain are controlled to achieve resultant velocities within the range of laminar air flow when a critical object, floor, or other surface is encountered. The range of air velocities typically defined as laminar flow is about 40 feet per minute to about 190 feet per minute. When air moving within a range of laminar flow velocities, bouncing and other contamination causing turbulence will be substantially prevented when an object is encountered. The discharge velocity of the air curtain is specifically designed to be greater than the discharge velocity of the primary filtered air. Such differential in discharge velocities creates a Venturi effect vacuum action on the downward flow of primary air toward the down and outward air curtain flow. In this manner, horizontally outward directional components are also imparted to the downward flow of primary air and when critical objects or other surfaces are countered, the horizontal components become dominant, causing the primary air flow to move horizontally outward across the object in a state of laminar flow carrying away any generated contaminants within the clean area in a "sweeping" action. It is also known that the velocity of air discharged from a relatively small opening, such as the discharge ports of the extrusion 150, decreases rapidly as a function of the distance traveled and the size of the discharge opening. Therefore to achieve an air curtain velocity within the range of laminar flow when a critical object or floor surface is reached, proportionally higher discharge velocities must be utilized. For typical applications, it has been found that air curtain discharge velocities within the range of about 400 feet per minute to about 1600 feet per minute produce satisfactory results when used in combination with primary air discharge velocities within the range of about 60 feet per minute to about 120 feet per minute.

Accordingly, a vertical laminar flow filter module is provided that maintains a clean environment and controls turbulence within by utilizing two air streams and corresponding air supply means: an interior or primary air supply means that provides clean, primary air flow within a range of laminar flow velocities, and an outside or perimeter air supply means that provides clean perimeter air flow to a unique nozzle design that generates a curtain of air and causes it to flow unidirectionally and aerodynamically. The air curtain is discharged at a velocity that is sufficient to maintain and operate the air curtain under a range of laminar flow velocities when the air curtain reaches a critical object or other surface to prevent bouncing or other turbulence. A proper balance of the two air stream velocities assures optimal clean air flow at working levels and prevents contamination causing turbulence commonly found in prior art laminar flow devices or systems when the primary and perimeter air flows change from substantially vertical to substantially horizontal directions of flow. The balance of air flows achieved by the vertical laminar flow filter module prevents turbulence within the clean area and instead creates a cleansing action when a change in air direction occurs.

Shown in FIG. 8 at 196 is an alternative embodiment of the filter module 10. The alternative filter module 196 is substantially identical to the filter module 10 except that the blowers for the primary and perimeter air supplies are separated and contained in side compartments 198 and 200 respectively. The side compartments 198 and 200 include side inlets 202 for drawing unfiltered air into the side compartments. The side inlets are covered with protective stainless steel or galvanized steel grilles and frames 204 that also cover the prefilters and provide an esthetically pleasing appearance to the alternative filter module 196. Optional magnehelic gauges 206 and 208 are also shown in FIG. 8. These gauges measure the pressure of the filtered air coming out of the primary and perimeter filters. A predetermined pressure drop between unfiltered and filtered air, as indicated by the gauges, suggests that the HEPA filters require servicing or replacing. An access door 210 for the perimeter air filter in the side compartment 200 is also shown on the bottom of the alternative filter module 196.

The filter modules 10 and 196 may be constructed of any suitable material that exhibits properties of strength, durability, economy, and attractive appearance. Examples of such materials are welded stainless steel, welded cold rolled steel finished with a baked enamel finish, and plywood or pressed wood chips with the exterior finished with plastic laminate and the interior finished with Sanitary Ware Gel Coat.

It is understood that the foregoing description is that of the preferred embodiments of the invention and that various changes and modifications may be made thereto without departing from the spirit and scope of the invention, as defined in the appended claims.

I claim:

1. A vertical laminar flow filter module comprising: a filter module box having open ends and a permeable filter means substantially closing off the bottom of said box but allowing for the passage of air therethrough, means for supporting said filter module box above a surface, nozzle means for adjustably delivering a curtain of air with varying outward horizontal directional components substantially downward around the perimeter of said permeable filter means to define a work area, and air supply means for supplying air of differential velocities to said permeable filter means and to said nozzle means so that air can be directed downward as laminar flow from said permeable filter means and air can be directed from said nozzle means as a curtain surrounding the laminar flow of air over said work area.

2. A vertical laminar flow filter module as described in claim 1, wherein said nozzle means comprise a linear valve element that is adjustably supported within a pair of opposing arcuate recesses, said valve element being supported slightly outboard of the axial centerline of said recesses.

3. A vertical laminar flow filter module as described in claim 1, wherein said supply means is constructed to cause air to be directed from said permeable filter means within a range of laminar flow air velocities and said air curtain to be discharged from said nozzle means within a range of air velocities substantially greater than said laminar flow velocity range.

4. A vertical laminar flow filter module comprising:
a filter module box having open ends and a permeable filter means substantially closing off the bottom of said box but allowing for the passage of air therethrough,
means for supporting said filter module box above a surface,
air nozzle means extending around the perimeter of said permeable filter means for directing a curtain of air downward to define a work area, said nozzle means including adjustment means whereby said curtain of air can be given varying outward horizontal directional components to its downward flow, and
air supply means for supplying air to said permeable filter means and to said air nozzle means at differential velocities so that air can be directed downward from said permeable filter means as laminar flow and air can be directed from said air nozzle means as a curtain surrounding the laminar flow of air over said work area, said air supply means including perimeter and interior air ducts that extend through said filter module box to said air nozzle means and said permeable filter means.

5. A vertical laminar flow filter module as described in claim 4, wherein said permeable filter means comprises at least one HEPA filter.

6. A vertical laminar flow filter module as described in claim 5, wherein said permeable filter means has an upstream side and a downstream side with respect to the flow of air through said filter means, and said air supply means includes at least one blower located on the upstream side of said permeable filter means for delivering air through said permeable filter means to provide a flow of air over said work area within a velocity range of laminar flow, and one blower for delivering air to said air nozzle means to be discharged therefrom within a range of air velocities substantially greater than said velocity range of laminar flow.

7. A vertical laminar flow filter module as described in claim 6, wherein said air supply means is constructed to cause air to be directed downward from said permeable filter means within a velocity range of about 60 feet per minute to about 120 feet per minute, and air to be discharged from said air nozzle means within a velocity range of about 400 feet per minute to about 1600 feet per minute.

8. A vertical laminar flow filter module comprising:
a filter module box having open ends and at least one horizontal primary air filter substantially closing off the bottom of said box but allowing for the passage of air therethrough,
means for supporting said filter module box above a surface,
air nozzle means extending around the perimeter of said bottom for directing a curtain of air downward to define a work area, said air nozzle means including adjustment means whereby the downward flow of said curtain of air can be imparted with a horizontal component away from said filter module, said air nozzle means comprising:
a linear extrusion with parallel outboard and inboard walls, said outboard and inboard walls being connected by a plurality of brackets, said outward wall being thicker in cross-section than said inboard wall, each of said walls carrying an arcuate recess substantially at its downstream end, said recesses being configured as if generated from a radius located substantially on the axial centerline of said extrusion, whereby said arcuate recess in said thicker outboard wall extends further towards the centerline of said extrusion than said arcuate recess in said inboard wall,
a linear valve element supported eccentrically within said recesses and movable relative to said recesses, said valve element being flexible and adjustable at a plurality of locations along its length to selectively vary and adjust the air flow from said air nozzle means around the perimeter of said work area, whereby vertical adjustment of said valve element within said recesses will control the direction and amount of air curtain flow from said nozzle means, and
air supply means for delivering filtered air through said air nozzle means within a velocity range substantially greater than laminar flow, and for delivering air under pressure to the upstream side of said at least one primary air filter for passage therethrough to provide a flow of filtered air downward over said work area within a velocity range of laminar flow for discharge through said work area within said air curtain.

9. A vertical laminar flow filter module as described in claim 8, wherein said air supply means comprises at least one primary air supply blower and primary air passage means for delivering said air pressure to the upstream side of said at least one primary air filter, and a perimeter air supply blower and a perimeter air passage means containing an air filter for delivering filtered air through said air nozzle means.

10. A vertical laminar flow filter module as described in claim 9, wherein said primary and said perimeter air passage means are separate from one another, whereby with separate air supply blowers, maximum control of primary and perimeter air velocities is provided.

11. A vertical laminar flow filter module as described in claim 10, wherein said air supply means is constructed to cause filtered air to be directed downward from said at least one primary air filter within a velocity range of about 60 feet per minute to about 120 feet per minute, and filtered air to be discharged from said air nozzle means within a velocity range of about 400 feet per minute to about 1600 feet per minute.

12. A vertical laminar flow filter module as described in claim 8, wherein said brackets are spaced approximately 12 to approximately 18 inches apart along said linear extrusion.

13. A vertical laminar flow filter module comprising:
a filter module box supported on legs and having a side, top, and open ends and comprising at least one primary air filter substantially closing off the bottom of said box but allowing for the passage of air therethrough, said at least one primary air filter having an upstream side and a downstream side with respect to the flow of air through said at least one filter,
air nozzle means extending around the perimeter of said at least one filter for directing a curtain of air downward to define a work area, said air nozzle means including adjustment means whereby the downward flow of said air curtain can be imparted with a horizontal component away from said filter module, said air nozzle means comprising:
a linar extrusion with parallel outboard and inboard walls, said outboard and inboard walls being connected by a plurality of brackets, said outboard wall being thicker in cross-section than said inboard wall, each of said walls carrying an arcuate recess substantially at its downstream end, said recess being configured as if generated from a radius located on the axial centerline of said extrusion, whereby said arcuate recess in said thicker outboard wall extends further towards the centerline of said extrusion than said arcuate recess in said inboard wall, and
a flexible arcuate valve element that is adjustably mounted to said linear extrusion and eccentrically supported within said recesses by a valve element mounting means, said mounting means including a spring means and an adjustment screw with a head and a threaded portion, said head of said adjustment screw being seated up through the downstream side of said valve element and said threaded portion being threaded into a tapped bracket hole which lies in each of said brackets slightly off-center toward the outboard side of said extrusion, said spring means being supported between said valve element and said brackets to urge said valve element downward, whereby said adjustment screw permits said valve element to be controllably moved relative to said recesses thereby creating varying inboard and outboard discharge ports between said valve element and the ends of said recesses closest to said valve element, said discharge ports determining the amount of air permitted to flow on each side of said valve element, wherein the arcuate configuration of said recesses and said valve element imparts opposing horizontal components to the portions of perimeter air flowing from said discharge ports on each side of said valve element, whereby said air curtain is imparted with a net horizontal direction component away from said filter module, and air supply means for delivering filtered air through said air nozzle means within a velocity range substantially greater than laminar flow and for delivering air under pressure to the upstream side of said at least one primary air filter for passage therethrough to provide a flow of filtered air downward over said work area within a velocity range of laminar flow for discharge through said work area within said air curtain, said air supply means comprising at least one primary air supply blower and primary passage means for delivering said air pressure to the upstream side of said at least one primary air filter, and a perimeter air supply blower and a perimeter air passage means containing an air filter for delivering filtered air through said air nozzle means, whereby said primary and said perimeter air passage means are separate from one another to provide maximum control and differentiation of primary and perimeter air flow velocities.

14. A vertical laminar flow filter module as described in claim 13, wherein said linear extrusion has an H-shaped cross-section wih flanges extending outward from the downward ends of said inboard and said outboard walls and extensions extending upwards from the outboard end of said flanges, whereby said extrusion can be readily fitted to the downstream edges of said perimeter air passage means.

15. A vertical laminar flow filter module as described in claim 14, wherein said brackets are spaced approximately 12 to approximately 18 inches apart along said linear extrusion, whereby maximum control of said flexible valve element is achieved.

16. A vertical laminar flow filter module as described in claim 13, further comprising a plurality of lights provided in light pockets located in said bottom of said filter module outside the flow of said air curtain.

17. A vertical laminar flow filter module as described in claim 16, wherein auxiliary lights are provided on the downstream side of said at least one primary filter.

18. A vertical laminar flow filter module as described in clim 13, wherein said air supply means is constructed to impart said air curtain with a net horizontal direction component away from said filter module which will cause said air curtain to change directions upon encountering an object with a minimum of turbulence.

19. A vertical laminar flow filter module as described in claim 13, wherein said at least one primary air supply blower and primary passage means, and said perimeter air supply blower and perimeter air passage means, are constructed to impart differential velocities to said air curtain and said downward laminar flow from said at least one primary filter to create a vacuum on said downward laminar flow from said at least one primary filter, thereby imparting horizontal direction components to said downward flow toward said air curtain, whereby said horizontal component becomes dominant when an object is encountered and said downward laminar flow changes direction toward said air curtain with a minimum of turbulence.

20. A vertical laminar filter module as described in claim 13, wherein said at least one primary air supply blower and said primary passage means are constructed to cause filtered air to be directed downward from said at least one primary air filter within a velocity range of about 60 feet per minute to about 120 feet per minute and said perimeter air supply blower and said perimeter air passage means are constructed to cause filtered air to be discharged from said air nozzle means within a velocity range of about 400 feet per minute to about 1600 feet per minute.

21. A vertical laminar flow filter module as described in claim 13, wherein said at least one primary blower and perimeter air supply blower are contained in a blower compartment within said filter module, said blower compartment including at least one air inlet, said at least one air inlet being fitted with a prefilter.

22. A vertical laminar flow filter module as described in claim 13, wherein said at least one primary blower and perimeter air supply blower are contained in separate compartments within the sides of said filter module, said compartments each including at least one air inlet, said at least one air inlets being fitted with a prefilter.

* * * * *

UNITED STATES PATENT AND TRADEMARK OFFICE
CERTIFICATE OF CORRECTION

PATENT NO. : 4,427,427
DATED : 1-24-84
INVENTOR(S) : Francisco DeVecchi

It is certified that error appears in the above-identified patent and that said Letters Patent is hereby corrected as shown below:

Title page, reference Wilcox dated 6/77, "4030618" should be --4030518--.

Column 1, line 26, "efficiences" should be --efficiencies--.

Column 1, line 33, "clear" should be --clean--.

Column 1, line 34, "issed" should be --issued--.

Column 2, line 24, "air-born" should be --air-borne--.

Column 5, line 44, "filters" should be --filter--.

Column 5, line 57, "unfilered" should be --unfiltered--.

Column 8, line 68, "countered" should be --encountered--.

Column 9, line 53, "esthetically" should be --aesthetically--.

Column 10, line 28, "comprise" should be --comprises--.

Column 10, line 34, after "said" insert --air--.

UNITED STATES PATENT AND TRADEMARK OFFICE
CERTIFICATE OF CORRECTION

PATENT NO. : 4,427,427

DATED : 1-24-84

INVENTOR(S) : Francisco DeVecchi

It is certified that error appears in the above-identified patent and that said Letters Patent is hereby corrected as shown below:

Column 10, line 35, after "directed" insert --downward--.

Column 13, line 32, "wih" should be --with--.

Column 14, line 5, "clim" should be --claim--.

Signed and Sealed this

Seventeenth Day of July 1984

[SEAL]

*Attest:*

GERALD J. MOSSINGHOFF

*Attesting Officer*  *Commissioner of Patents and Trademarks*